Dec. 17, 1935.　　A. L. MILLAR　　2,024,700
SCREW PROPELLER
Filed Oct. 9, 1934　　2 Sheets-Sheet 1
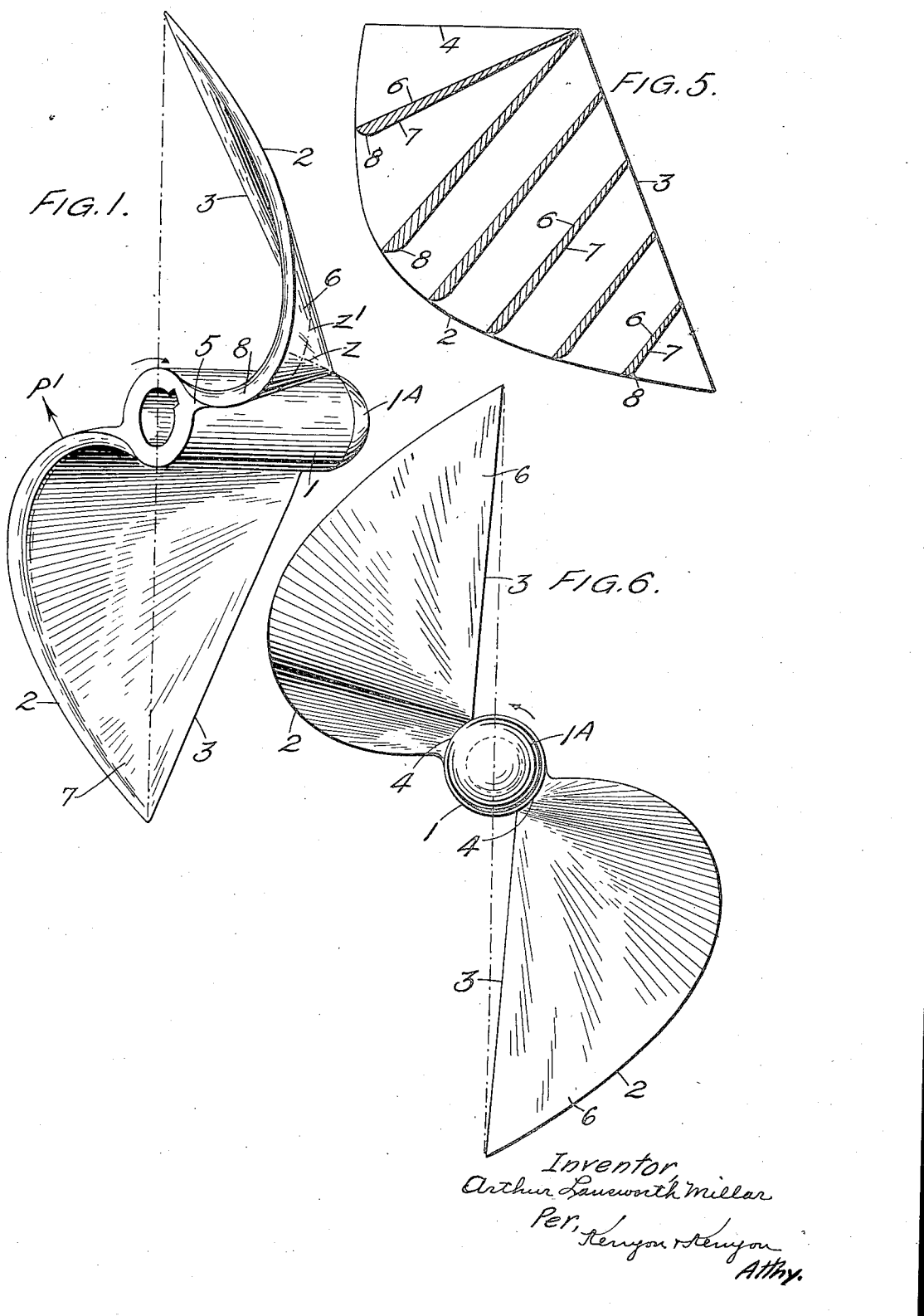
Inventor
Arthur Lanworth Millar
Per, Kenyon & Kenyon
Atty.

Dec. 17, 1935.   A. L. MILLAR   2,024,700
SCREW PROPELLER
Filed Oct. 9, 1934   2 Sheets-Sheet 2
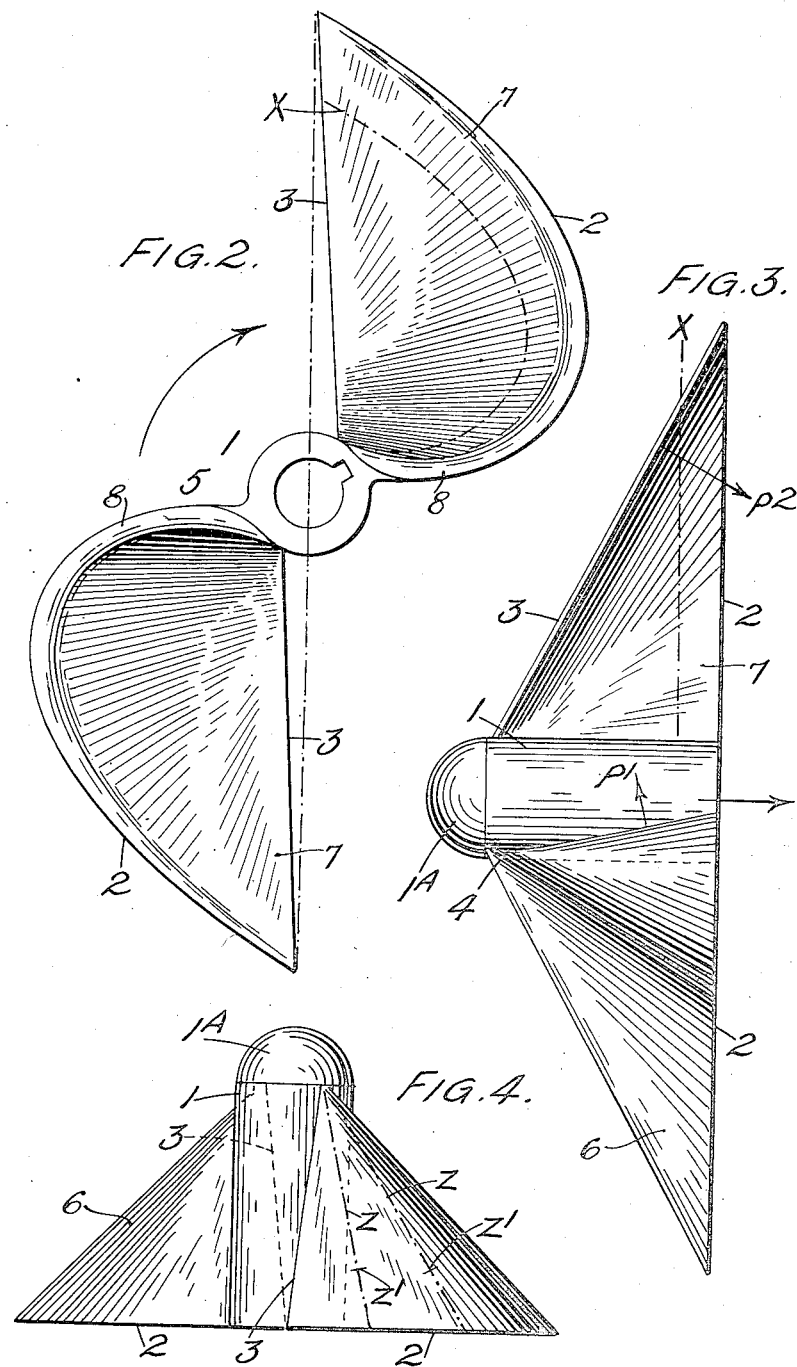
Inventor,
Arthur Lansworth Millar
Per, Kenyon & Kenyon
Atty Patented Dec. 17, 1935

2,024,700

UNITED STATES PATENT OFFICE 2,024,700

SCREW PROPELLER

Arthur Lansworth Millar, Barnsbury, England

Application October 9, 1934, Serial No. 747,486
In Great Britain October 17, 1933

10 Claims. (Cl. 170—156)

This invention relates to improvements in and connected with screws for propulsion, and is principally applicable to the screw propellers of all craft moving on or through water. The invention may also be applicable to a rotatable propeller or impeller in a fixed position.

In existing practice the following features describe broadly what may be found in common use, and these features are either employed separately or together:

1. The greatest width of the blade directly between the forward and trailing edges is usually nearer the tip than the boss;
2. The blades are of helical form;
3. The blades on their driving front and rear surfaces are convex;
4. The leading and trailing edges are brought to a V-shaped sectional margin of approximate symmetry of section;
5. The leading edges are not at right-angles to the shaft but pass away rearward according to the shape of the blade and the pitch developed;
6. The blade does not end in a sharp tip;
7. The blades have a pitch in relation to the axis of the propeller shaft.

In contrast to the above general features, I have discovered that by radically departing from them upon the lines indicated below, I can produce a screw or propeller which is more efficient in performance.

The object of the present invention is to improve efficiency in use; to diminish unwanted disturbance in the fluid; and in some cases to obtain the useful effects of a propeller without some of the usual disadvantages. An object of the invention may also be to provide a propeller or propeller blade making use of forces available from fluid reaction, not hitherto recognized.

The following features are to be found in my improved screw propeller; they need not necessarily all be present, but it is believed that each of them which is roughly outlined below and which is claimed in this specification contributes to some extent to the advantage of this invention, although the omission of or variation from any one or more of the features separately does not necessarily depart from the invention.

In accordance with the invention, a propeller blade is so formed that its area adjacent to its root is flared and its area near the tip is pitched. By "flared" is meant with perpendiculars having a predominating radial or tangential component, and by "pitched" is meant with perpendiculars having a predominating axial component.

Further, a blade having the above feature has a curved leading edge and a straight trailing edge, and its root chord is a line lying parallel with or acutely inclined to the axis of rotation of the propeller and the series of chords from root to tip have increasing angles to the axis as they progress outwardly. Such a blade may have the form generated by a plate with a virtually straight-line root edge or chord, a virtually straight-line trailing edge meeting the trailing end of the root line and a leading edge formed in a convexly curved line extending from the leading end of the root line to the tip, the plate so shaped being deformed so that the curved edge lies in a plane which is normal to the axis of rotation and the trailing edge inclines forwardly from root to tip so that the line thereof (or the line produced) intersects the plane at an acute angle.

Preferably, the blade (or blades) of my propeller has a pointed tip formed by the convergence of the trailing and leading edges in the plane of the latter. In a propeller blade with the above features it is preferred to adopt a blade form which has unsymmetrically cambered sections, the leading surface (i. e. the positively loaded surface) being of straight-line chord and the trailing surface being convex, the maximum depth of section being nearer the leading edge than the trailing edge. In such a case the trailing surface may also have a practically straight-line chord except in the immediate vicinity of the leading edge where it is convexly curved to form, as it were, the hump of the chamber. In a propeller having such blades the leading edges of the blades, or of symmetrically opposed blades, may lie in one plane which is at right angles to the axis of rotation. Moreover, the trailing edges, in rotation, describe or sweep a circular rectilinear cone with its base towards the leading edge (and in fact described by the leading edge in rotation) and its apex towards the rear. With regard to the root end of each blade, if it be imagined to meet a cylinder which is coaxial with the propeller it describes a helix upon the cylinder of relatively great pitch. The trailing edges of the blades are directed tangentially to, and not radially to, the axis of rotation. The curvature of the blade is such that sections of it in the plane of rotation substantially follow a spiral generated from an axis at or near the axis of rotation, and this spiral may be of Archimedean form. Moreover, the sections referred to as spiral progressively diminish in length from the leading edge towards the trailing edge and are not necessarily spiral if taken near the trailing edge. The invention thus includes a propeller having blades with straight trailing edges, helically inclined roots rigid with a boss, and leading edges lying in the plane of rotation and curved spirally. The spiral is preferably such that a tangent thereto at or near the root is about at right angles to a tangent considerably nearer the tip. It will be found that in a propeller having the above features all lines drawn from one point which is near the root at the trailing edge, to the leading edge, are straight, and all lines on the same surface at right angles to these first lines are curved.

The following drawings illustrate a two-bladed propeller for use in water, constructed according to the invention; in these drawings:

Figure 1 shows a perspective view of the propeller from the front thereof and the side of the propeller shaft;

Figure 2 is a front elevation looking along the line of the shaft;

Figure 3 is a side elevation of the propeller depicted in Figures 1 and 2, and

Figure 4 is a plan view of the same propeller;

Figure 5 shows the outline of a lamina which by suitable distortion can be bent to give the blade shape of the propeller illustrated, and on this figure are superimposed sections of the blade throughout its span;

Figure 6 shows a rear elevation along the shaft and therefore opposite to that of Figure 2.

From the drawings it will be seen that the two blades of the propeller are secured to a boss 1, and this boss preferably has a hemispherical trailing end, as at 1A. This boss is of course intended to be suitably secured to the propeller shaft. To the boss are secured integrally or by attachment a pair of blades. Each blade is formed as follows: It has a leading edge 2 which is curved, and a trailing edge 3 which is straight. The leading edge 2 lies in a single plane which is at right-angles to the axis of the propeller, as can be more clearly seen in Figures 3 and 4. However many blades there are, it is at present proposed that all their leading edges shall lie in a single plane. The trailing edges 3 of opposed blades present a conical appearance, as seen in Figure 3. The root chord is imagined as a straight line, indicated at 4 in Figures 4 and 5, and the root of each blade is merged into the boss in a smooth manner, as can be seen at 5, in actual construction. The root of a blade meets the boss 1 helically, that is to say the root at the leading edge is angularly advanced from the root at the trailing edge. The pitch of the helix is acutely inclined to the axis of rotation, the section of a blade is cambered; in the developed blade of Figure 5, it is flat, as shown in Figure 5 at 6, on the leading surface, and convex on the trailing surface, although the majority of trailing surface is flat, as at 7, but convexly curved at 8 in the immediate vicinity of the leading edge 2. The sections throughout the span of the blade are of the same camber form. The blade of the propeller illustrated is formed as to its shape when a lamina of the outline depicted in Figure 5 has the root edge 4 secured to a boss with the helical inclination as shown; the pitch of this helix is, in the case drawn, such as to conform with a 24" pitch at the root of a propeller having a radius of 5.93" and a boss of 3" axial length where met by the blade, and the lamina is then bent so as to decrease the angle between the line 4 and the edge 3 until the edge 2 lies in a single plane at right-angles to the propeller axis. By this deformation the blade as illustrated is produced, and it will be observed that the leading edge 2 is then of spiral form, and the flatness at 6 (Figure 5) will be slightly convex, and at 7 slightly concave, towards the tip. Moreover, sections through the blade taken radially to the axis are spiral and diminish in length from the longest and most curved spiral formed by the leading edge 2 progressively towards the trailing portion; a section line of this order is indicated in Figures 2 and 3 at X. Moreover, a point can be found, for example point Y, (Figures 1 and 4) on a leading surface in close proximity to the trailing end of the root chord 4, in respect of which all lines (such as Z) drawn to the leading edge will be found to be straight (see Figure 4). Also, all lines drawn on the leading surface at right-angles to the line Z will be found to be curved; for clearness such a line is illustrated on Figure 1 at Z'.

It will be observed that as a result of this formation, that part of the blade area nearer the root of a blade has its perpendiculars predominantly tangential to the axis of rotation, for example a perpendicular P' in Figure 1, whereas the area towards the tip is pitched, i. e. a perpendicular to the surface such as $P^2$ (Figure 3) is predominantly axial in direction. It will also be observed that the blade is of substantially triangular form as viewed either in end or side elevation, the triangle being right-angular or nearly right-angular, and from ahead or astern a projection of a blade is of the general form of the triangle, except of course that the edge 2 is curved. It will also be observed (see Figure 2) that the trailing edges 3 are directed tangentially to a cylinder concentric with the propeller axis.

A propeller constructed on the above lines may, it is believed, function best with one blade; it may, however, be multibladed. It rotates in the direction of the arrow in Figure 2 and travels in the direction of the arrow in Figure 3. Practical tests have shown that the propeller substantially as drawn shows a marked comparative increase in efficiency, and the disturbance from, or from a craft to which it is fitted, is of markedly different character from that comparable with orthodox propellers. It is also believed that cavitation may be minimized or obviated.

What I claim is:—

1. A propeller blade having its leading edge lying in a plane at right angles to its axis of rotation and being in the form of a spiral convex in the direction of rotation and having its trailing edge straight and inclined forwardly into meeting relation with said leading edge and having its root edge helical with respect to the axis of rotation with its front end angularly ahead of its rear end in the direction of rotation.

2. A propeller blade according to claim 1, in which the area near the root which is flared and the area near the blade tip is pitched.

3. A propeller blade according to claim 1 in which the root cord is a line lying parallel acutely inclined to the axis of rotation and the series of cords from the root to the tip have increasing angles to the axis.

4. A propeller blade according to claim 1 having a tapered tip formed by the convergence of the trailing and leading edges in the plane of the latter.

5. A propeller blade according to claim 1 having unsymmetrically cambered sections, the leading surface being substantially straight-line and the trailing surface being convex, the maximum depth of section being nearer the leading edge than the trailing edge.

6. A propeller blade according to claim 1 having unsymmetrically cambered sections, the leading surface being substantially straight-line and the trailing surface being convex, the maximum depth of section being nearer the leading edge than the trailing edge and the trailing surface being substantially straight-line except in the immediate vicinity of the leading edge.

7. A propeller blade according to claim 1 having a helically inclined root rigid with a boss and a leading edge lying in the plane of rotation and the following an Archimedean spiral.

8. A propeller blade according to claim 1 so curved and tapered from root to tip that radial sections of it taken in the plane of rotation substantially follow a spiral generated from an axis at or near the axis of rotation.

9. A propeller blade according to claim 1 in which all lines drawn from a point on the leading surface near the trailing end of the root edge to the leading edge are straight lines.

10. A propeller blade according to claim 1 in which the most forward leading point of the leading edge leads the tip by approximately 60°.

ARTHUR LANSWORTH MILLAR.

CERTIFICATE OF CORRECTION.

Patent No. 2,024,700.  December 17, 1935.

ARTHUR LANSWORTH MILLAR.

It is hereby certified that error appears in the printed specification of the above numbered patent requiring correction as follows: Page 1, second column, line 34, for "chamber" read camber; and that the said Letters Patent should be read with this correction therein that the same may conform to the record of the case in the Patent Office.

Signed and sealed this 4th day of February, A. D. 1936.

Leslie Frazer (Seal)  Acting Commissioner of Patents.